US007687014B2

(12) United States Patent
Zheng et al.

(10) Patent No.: US 7,687,014 B2
(45) Date of Patent: Mar. 30, 2010

(54) CO-FIRING OF MAGNETIC AND DIELECTRIC MATERIALS FOR FABRICATING COMPOSITE ASSEMBLIES FOR CIRCULATORS AND ISOLATORS

(75) Inventors: Jingmin Zheng, Frederick, MD (US); David B. Cruickshank, Rockville, MD (US); David M. Firor, Thurmont, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 7 days.

(21) Appl. No.: 12/055,416

(22) Filed: Mar. 26, 2008

(65) Prior Publication Data

US 2009/0243163 A1 Oct. 1, 2009

(51) Int. Cl.
*C04B 33/32* (2006.01)

(52) U.S. Cl. ........................ 264/611; 264/614; 264/642

(58) Field of Classification Search ................. 264/605, 264/611, 603, 614, 642; 65/428
See application file for complete search history.

(56) References Cited

U.S. PATENT DOCUMENTS 6,504,444 B1 1/2003 Furuya et al.
6,844,789 B2 1/2005 Lombardi et al.
6,938,443 B1 * 9/2005 Fabian ......................... 65/412

FOREIGN PATENT DOCUMENTS

GB 2235339 A * 2/1991
JP 06112028 A * 4/1994
JP 08078284 A 3/1996

OTHER PUBLICATIONS

V.T. Zaspalis et al. “Materials for inductive and microwave function integration in LTCC-technology multichip modules.” Journal of Physics: Conference Series 10(2005). pp. 357-360.

* cited by examiner

*Primary Examiner*—Steven P Griffin
*Assistant Examiner*—Erin Snelting

(57) ABSTRACT

A method for making a composite magnetic-dielectric disc assembly includes forming a dielectric ceramic cylinder, forming a magnetic ceramic rod, assembling the magnetic ceramic rod coaxially inside the dielectric ceramic cylinder to form a rod-and-cylinder assembly, kilning (firing) the rod-and-cylinder assembly, slicing the rod-and-cylinder assembly to form a plurality of composite magnetic-dielectric disc-shaped assemblies. The magnetic-dielectric disc assemblies can be used in manufacturing, for example, circulators, isolators or similar electronic components. Accordingly, the method for making the disc assemblies can be included as part of a method for making such electronic components.

5 Claims, 3 Drawing Sheets

38
56
36
38
56'
36
38
56"
36

CO-FIRING OF MAGNETIC AND DIELECTRIC MATERIALS FOR FABRICATING COMPOSITE ASSEMBLIES FOR CIRCULATORS AND ISOLATORS

BACKGROUND

Circulators and isolators are passive electronic devices that are used in high-frequency (e.g., microwave) radio frequency systems to permit a signal to pass in one direction while providing high isolation to reflected energy in the reverse direction. Circulators and isolators commonly include a disc-shaped assembly comprising a disc-shaped ferrite or other ferromagnetic ceramic element, disposed concentrically within an annular dielectric element. One of the most commonly used ferrite materials is yttrium-iron-garnet (YIG), due to its low-loss microwave characteristics. The annular dielectric element is similarly commonly made of ceramic material.

A conventional process for making the above-referenced composite disc assemblies is illustrated by the flow diagram of FIG. 1. At step 12, a cylinder is formed from a dielectric ceramic material. At step 14, the (unfired or "green") cylinder is then fired in a kiln (commonly referred to simply as "firing"). At step 16, the outside surface of the cylinder is then machined to ensure its outside diameter (OD) is of a selected dimension. Achieving precise dimensions in the assembly elements is important because the dimensions affect microwave waveguide characteristics. At step 18, the inside surface of the cylinder is similarly machined to ensure its inside diameter (ID) is of a selected dimension. In addition, at step 20, a rod is formed from a magnetic ceramic material. At step 22, the rod is then fired, and at step 24 its surface is machined to a selected OD. The rod OD is slightly less than the cylinder OD so that the rod can be fitted securely within the cylinder, as described below. Achieving a close fit that promotes good adhesion between the rod and cylinder is a reason that both the outside surface of the rod and the inside surface of the cylinder are machined to precise tolerances.

At step 26, epoxy adhesive is applied to the one or both of the rod and cylinder. At step 28, the rod is inserted inside the cylinder to form a rod-and-cylinder assembly, and the epoxy is allowed to cure (harden), as indicated by step 30. At step 32, the outside surface of the rod-and-cylinder assembly is again machined to a precise OD. Lastly, at step 34, the rod-and-cylinder assembly is sliced into a number of disc assemblies. Each disc assembly thus comprises a magnetic ceramic disc disposed concentrically within a dielectric ceramic ring. Each disc assembly is typically several millimeters in thickness.

The time involved in machining the inside surface of the cylinder to promote adhesion, applying epoxy to the parts, carefully handling and assembling the epoxy-laden parts, and curing the epoxy, contributes to inefficiency in the process. It would be desirable to provide a more efficient method for making composite magnetic-dielectric disc assemblies.

SUMMARY

In accordance with exemplary embodiments of the invention, a method for making a composite magnetic-dielectric disc assembly comprises forming a dielectric ceramic cylinder, forming a magnetic ceramic rod, assembling the magnetic ceramic rod coaxially inside the dielectric ceramic cylinder to form a rod-and-cylinder assembly, firing the rod-and-cylinder assembly, slicing the rod-and-cylinder assembly to form a plurality of composite magnetic-dielectric disc-shaped assemblies. The magnetic-dielectric disc assemblies can be used in manufacturing, for example, circulators, isolators or similar electronic components. Accordingly, the method for making disc assemblies can be included as part of a method for making such electronic components.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
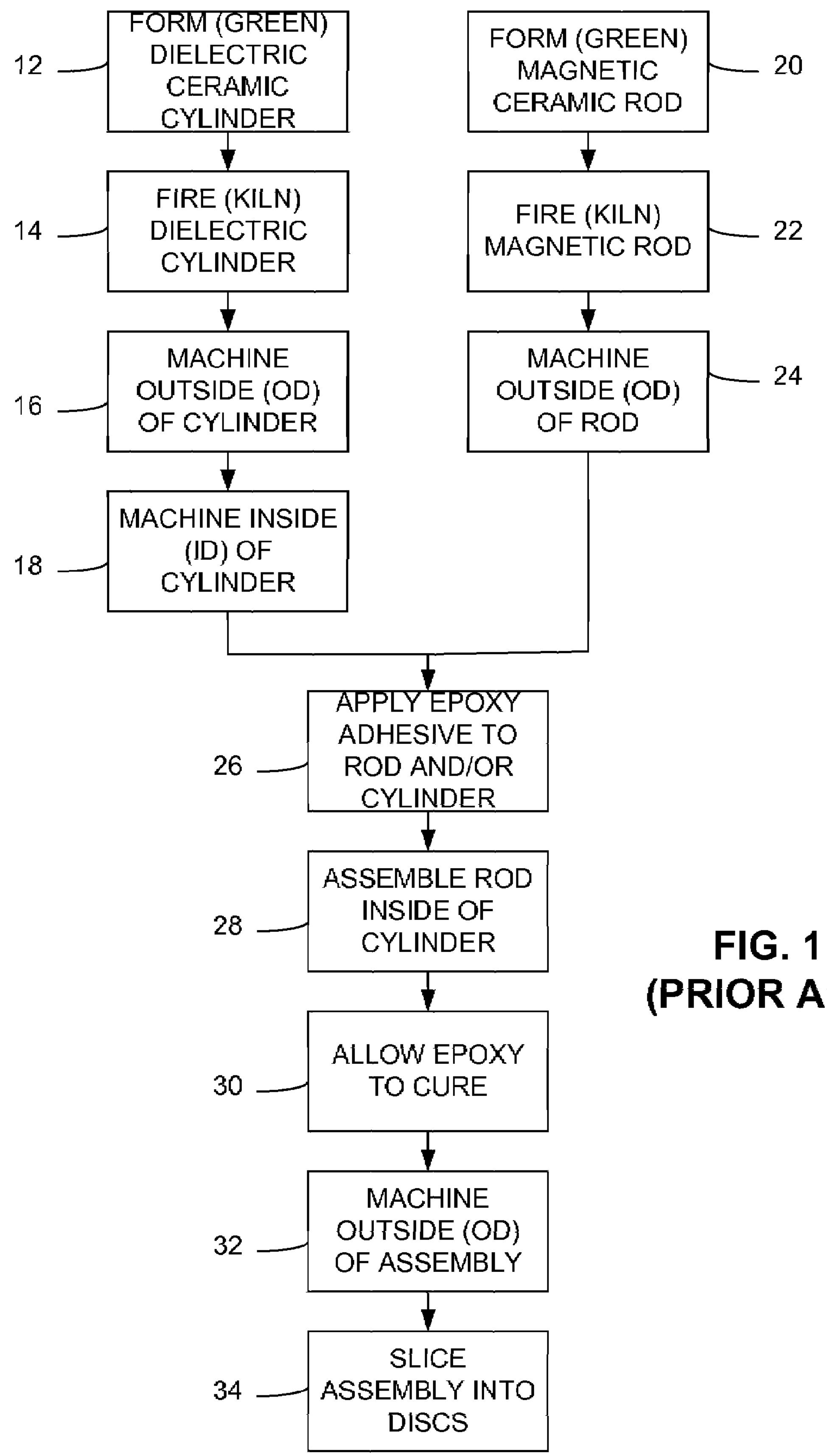
FIG. 1 is a flow diagram of a method for fabricating composite magnetic-dielectric disc assemblies, in accordance with the prior art.
Figure 2:
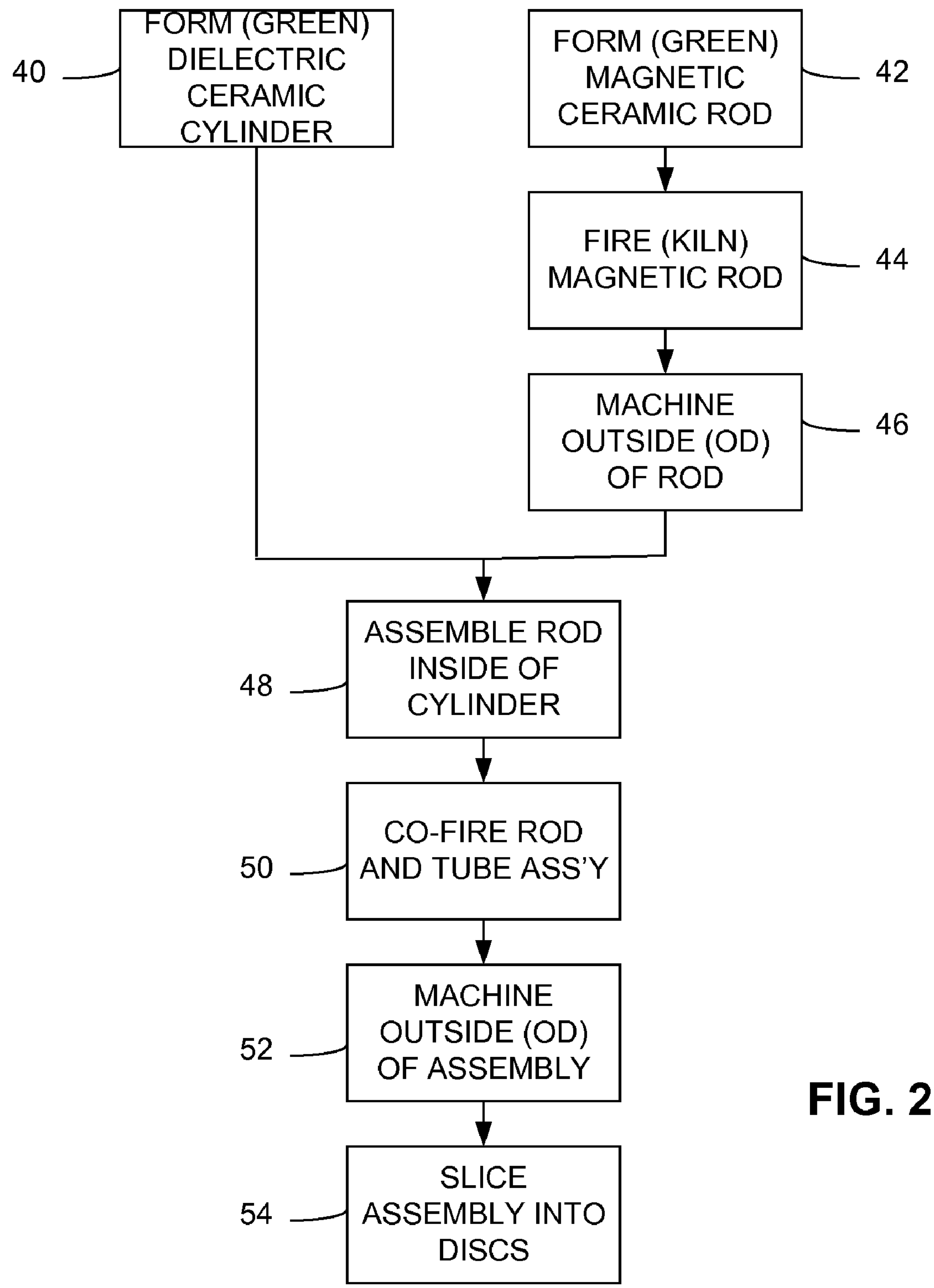
FIG. 2 is a flow diagram of a method for fabricating composite magnetic-dielectric disc assemblies, in accordance with an exemplary embodiment of the present invention.
Figure 3:
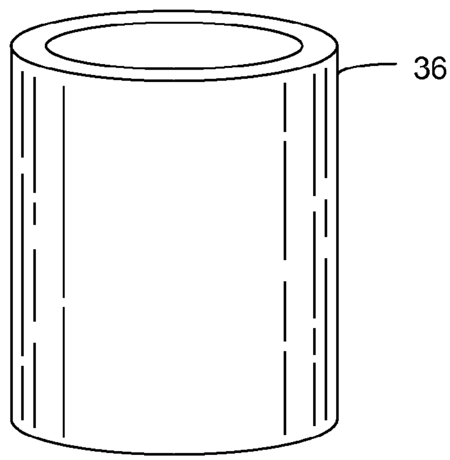
FIG. 3 is a perspective view of a dielectric ceramic cylinder, in accordance with the exemplary embodiment.
Figure 4:
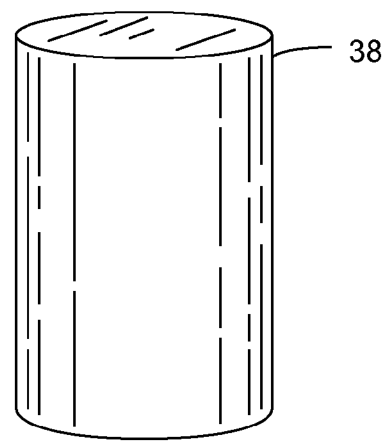
FIG. 4 is perspective view of a magnetic ceramic rod, in accordance with the exemplary embodiment.

In accordance with an exemplary embodiment of the invention, a process for making composite magnetic-dielectric disc assemblies is illustrated by the flow diagram of FIG. 2. Referring briefly to FIGS. 3-7, the process involves a dielectric ceramic cylinder 36 and a magnetic ceramic rod 38.

Returning to FIG. 2, at step 40, cylinder 36 (FIG. 3) is formed from a dielectric ceramic material by any suitable conventional process known in the art for making such elements, i.e., dielectric ceramic elements of the types used in high frequency electronic components. Similarly, at step 42, rod 38 (FIG. 4) is formed from a magnetic ceramic material by any suitable conventional process. At step 44, rod 38 is sintered by firing it in a kiln (not shown). Some examples of materials and firing temperatures are set forth below, following this process flow description. However, persons skilled in the art to which the invention relates understand that the materials and processes by which magnetic ceramic and dielectric ceramic elements of this type are made are well known in the art. Therefore, suitable materials and temperatures are not listed exhaustively. All such suitable materials and process for making such rods, cylinders and similar elements of this type are intended to be within the scope of the invention.

Figure 5:
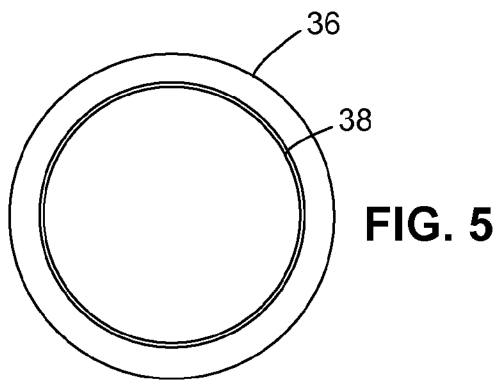
FIG. 5 is a top plan view of a rod-and-cylinder assembly, illustrating the rod of FIG. 4 inserted in the cylinder of FIG. 3.

At step 46, the outside surface of rod 38 is machined to ensure it is of an outside diameter (OD) that is less than the inside diameter (ID) of cylinder 36. At step 48, (the now pre-fired) rod 38 is received in (the unfired or "green") cylinder 36 to form the rod-and-cylinder assembly shown in FIG. 5. Though FIG. 5 is not to scale, note that the OD of rod 38 is slightly smaller than the ID of cylinder 36 to enable rod 38 to be received in cylinder 36.

Figure 6:
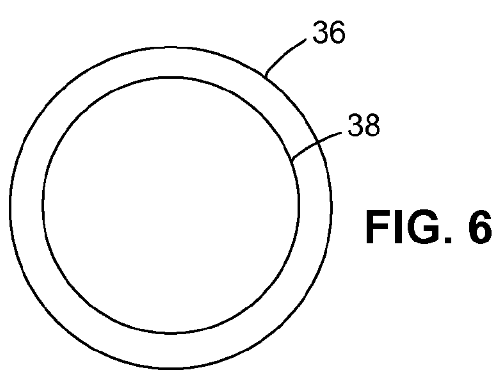
FIG. 6 is a top plan view similar to FIG. 5, showing the rod-and-cylinder assembly after firing.

At step 50, cylinder 36 and rod 38 are co-fired. That is, the rod-and-cylinder assembly (FIG. 5) is fired. The co-firing temperature is preferably lower than the temperature at which rod 38 was fired at step 44, to ensure that the physical and electrical properties of rod 38 remain unchanged. The co-firing temperature can be within the well-known range in which such cylinders are conventionally fired. Importantly, co-firing causes cylinder 36 to shrink around rod 38, thereby securing them together, as shown in FIG. 6. At step 52, the outside surface of the rod-and-cylinder assembly can then be machined to ensure it is of a specified or otherwise predetermined OD.

Figure 7:
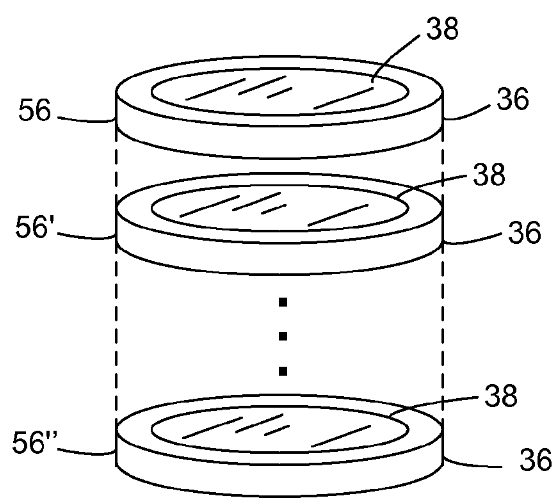
FIG. 7 is a perspective view of a plurality of composite magnetic-dielectric disc assemblies sliced from the rod-and-cylinder assembly of FIG. 6.

Lastly, at step 54, the rod-and-cylinder assembly is sliced into composite magnetic-dielectric disc assemblies 56, shown in FIG. 7. Composite magnetic-dielectric disc assemblies 56 can be used in manufacturing high frequency electronic components in the same manner as conventionally-produced assemblies of this type. However, the method of the present invention is more economical than conventional methods, as the invention does not involve the use of adhesives.

EXAMPLE 1

Rod 38 is made of yttrium-iron-garnet fired at or above about 1400 degrees C. Suitable material of this type is commercially available from a number of sources, including Trans-Tech, Inc. (a subsidiary of Skyworks Solutions, Inc.) of Adamstown, Md. Cylinder 36 is made of a ceramic material having a composition of MgO—CaO—ZnO—Al2O3-TiO2 co-fired with rod 38 at a temperature of about 1310 degrees C.

EXAMPLE 2

Rod 38 is made of calcium and vanadium-doped yttrium-iron-garnet fired at a temperature at or above 1350 degrees C. Suitable material of this type is commercially available from a number of sources, including Trans-Tech, Inc. (a subsidiary of Skyworks Solutions, Inc.) of Adamstown, Md. Cylinder 36 is made of a ceramic material having a composition of MgO—CaO—ZnO—Al2O3-TiO2 co-fired with rod 38 at a temperature of about 1310 degrees C.

While various embodiments of the invention have been described, it will be apparent to those of ordinary skill in the art that many more embodiments and implementations are possible that are within the scope of this invention. Accordingly, the invention is not to be restricted except in light of the following claims.

What is claimed is:

1. A method for making a composite magnetic-dielectric disc assembly, comprising:

forming an unfired dielectric ceramic cylinder;

forming a magnetic ceramic rod;

pre-firing the magnetic ceramic rod;

assembling the pre-fired magnetic ceramic rod coaxially inside the unfired dielectric ceramic cylinder to form a rod-and-cylinder assembly;

firing the rod-and-cylinder assembly to form a joined rod-and-cylinder assembly, wherein the firing step is performed at a temperature lower than a temperature at which the magnetic ceramic rod is pre-fired to promote dimensional stability of the magnetic ceramic rod during firing of the rod-and-cylinder assembly; and slicing the fired rod-and-cylinder assembly to at least one composite magnetic-dielectric disc assembly.

2. The method claimed in claim 1, further comprising machining an outside surface of the rod-and-cylinder assembly after the firing step.

3. The method claimed in claim 1, further comprising machining an outside surface of the pre-fired magnetic ceramic rod before the assembling step.

4. A method for making a composite magnetic-dielectric disc assembly, comprising:

forming an unfired dielectric ceramic cylinder;

forming a magnetic ceramic rod;

pre-firing the magnetic ceramic rod;

assembling the pre-fired magnetic ceramic rod coaxially inside the unfired dielectric ceramic cylinder to form a rod-and-cylinder assembly;

shrinking the dielectric ceramic cylinder of the rod-and-cylinder assembly around the magnetic ceramic rod of the rod-and-cylinder assembly to form a joined rod-and-cylinder assembly, wherein the firing step is performed at a temperature lower than a temperature at which the magnetic ceramic rod is pre-fired to promote dimensional stability of the magnetic ceramic rod during firing of the rod-and-cylinder assembly; and slicing the joined rod-and-cylinder assembly to form at least one composite magnetic-dielectric disc assembly.

5. In a method for making a circulator or isolator, a method for making a composite magnetic-dielectric disc assembly, comprising:

forming an unfired dielectric ceramic cylinder;

forming a magnetic ceramic rod;

pre-firing the magnetic ceramic rod;

assembling the pre-fired magnetic ceramic rod coaxially inside the dielectric ceramic cylinder to form a rod-and-cylinder assembly;

firing the rod-and-cylinder assembly to form a joined rod-and-cylinder assembly, wherein the firing step is performed at a temperature lower than a temperature at which the magnetic ceramic rod is pre-fired to promote dimensional stability of the magnetic ceramic rod during firing of the rod-and-cylinder assembly; and slicing the joined rod-and-cylinder assembly to form at least one composite magnetic-dielectric disc assembly.

* * * * *